(12) United States Patent
Edwards

(10) Patent No.: US 7,255,037 B2
(45) Date of Patent: Aug. 14, 2007

(54) SWITCH

(76) Inventor: Vincent Edwards, Autocraft Engineering 1991 Limited, Unit 1, St. Davids Industrial Estate, Pengam, Blackwood, Caerphilly, NP12 3SW (GB)

(*) Notice: Subject to any disclaimer, the term of this patent is extended or adjusted under 35 U.S.C. 154(b) by 0 days.

(21) Appl. No.: 11/234,893

(22) Filed: Sep. 26, 2005

(65) Prior Publication Data

US 2006/0065114 A1    Mar. 30, 2006

(30) Foreign Application Priority Data

Sep. 27, 2004 (GB) ................... 0421405.2
Jun. 21, 2005 (GB) ................... 0512596.8

(51) Int. Cl.
  *F01B 31/12* (2006.01)
  *H01H 35/02* (2006.01)
(52) U.S. Cl. .................... 92/5 R; 200/61.52
(58) Field of Classification Search ............ 92/5 R; 200/61.52; 91/1
See application file for complete search history.

(56) References Cited

U.S. PATENT DOCUMENTS

| 3,733,447 A | 5/1973 | Schneider, Jr. ......... 200/61.52 |
| 4,104,492 A | 8/1978 | Pliml, Jr. ................ 200/51.14 |
| 4,144,422 A | 3/1979 | Ramos .................... 200/61.52 |
| 4,534,521 A | 8/1985 | Sylven .................... 242/107.4 |
| 4,629,841 A | 12/1986 | Riback et al. .......... 200/153 A |
| 4,942,274 A | 7/1990 | Riack et al. ............. 200/84 C |
| 5,087,801 A * | 2/1992 | Johnston ................. 200/84 R |
| 5,142,108 A | 8/1992 | Johnston et al. ........ 200/84 R |
| 5,955,713 A * | 9/1999 | Titus et al. ............. 200/61.52 |

FOREIGN PATENT DOCUMENTS

| FR | 2478301 A | 9/1981 |
| GB |  722831 A | 2/1955 |
| GB | 2265601 A | 6/1993 |
| JP | 9196211 A | 7/1997 |

\* cited by examiner

*Primary Examiner*—Michael Leslie
(74) *Attorney, Agent, or Firm*—Gorden & Jacobson, PC

(57) ABSTRACT

A switch is disclosed comprising a housing formed with a chamber along which a ball can roll. An element having a pair of arms is pivotally mounted within the housing, with one arm either side of the ball, such that an inclination of the switch causes the ball to move along the chamber and impinge on one arm of the element to correspondingly turn the element and change the operational state of the switch. The chamber acts as a dump for hydraulic fluid from the hydraulic circuit.

16 Claims, 5 Drawing Sheets

SWITCH

BACKGROUND TO THE INVENTION

The present invention is concerned with a switch for use in a locking mechanism and particularly but not exclusively, to a switch for use in a locking mechanism of a hydraulic circuit for ensuring the safe release of mechanical components.

Modern hydraulic circuits incorporating a "quick hitch" system facilitate a quick release and/or attachment of various mechanical components, such as the attachment of an excavator bucket to an excavator arm or crane lifting equipment. In this manner, different components can be readily assembled to suit a particular job function.

However, such hydraulic circuits have been found to release the mechanical components unexpectedly, which can have fatal consequences. Therefore, there is a requirement for a safety release mechanism to limit the assembly and/or disassembly of mechanical components to specific circumstances of operation.

SUMMARY OF THE INVENTION

In accordance with this invention as seen from a first aspect, there is provided a switch comprising a body formed with a chamber, a member disposed in said chamber for movement along a predetermined path, a pivotally mounted element having a pair of arms, one either side of said member, such that said member impinges on one arm or the other in the event of movement in one direction or the other along said path, to correspondingly turn said element and change said switch from one operational state to another.

Preferably, said switch is activated by tilt movement.

Preferably, said switch is arranged for said member to move along said path according to the gravitational force component acting on said member along said path.

Preferably, said member can move along said channel when said channel is declined relative to said member by an angle of at least 1 degree.

Preferably, said member comprises a ball which rolls along said channel.

Preferably the diameter of said ball is in the range 16-26 mm.

Preferably, the diameter of said ball is in the range 18-24 mm.

Preferably, the diameter of said ball is in the range 20-22 mm.

Preferably, said chamber acts as a dump for hydraulic fluid.

Preferably, said chamber is filled with hydraulic fluid from a hydraulic circuit. The chamber thus eliminates the need for a separate tank for the hydraulic circuit.

Preferably, said chamber acts as a dump for hydraulic fluid.

Preferably, said hydraulic fluid is oil.

Preferably, said hydraulic fluid lubricates said member and said element.

Preferably, said switch dampens any vibration of the switch.

Preferably, a mounting spindle of said element comprises at least one through passage arranged to align, at least in one rotational position thereof, with a duct formed in said body and forming part of a hydraulic circuit.

Preferably, said switch is used to limit the removal of components within a hydraulic circuit to specific operating circumstances. Thus, by positioning the hydraulic switch on a mechanical device at a specific orientation, the switching action can be forced to occur only when the device is suitably positioned. Using an excavator bucket as an example, the switch can be set to operate only when the bucket is placed on the ground. In the unfortunate event that the bucket releases above ground level, the orientation of the bucket and therefore the switch, will ensure that the bucket cannot fall to ground; a holding device will maintain the orientation of the bucket thereby preventing its release. To release the bucket from the arm of the excavator, it is necessary to re-orientate the bucket by placing the bucket on the ground. This will then permit the removal of the holding device and thus the bucket.

Preferably, said switch provides a limit to the working range of a hydraulically controlled device. In this manner, the switch can be used to restrict mechanical movement, for example in windy conditions.

In accordance with this invention as seen from a second aspect, there is provided a hydraulic circuit comprising a switch in accordance with the first aspect of the invention.

In accordance with this invention as seen from a third aspect, there is provided a locking mechanism comprising a switch in accordance with the first aspect of the invention.

In accordance with this invention as seen from a fourth aspect there is provided an excavator having a bucket for excavation, said bucket being operated by a hydraulic circuit incorporating a locking mechanism comprising a switch in accordance with the first aspect of the invention.

A description of a preferred embodiment of this invention will now be given by way of example only and with reference to the accompanying drawings in which.

DETAILED DESCRIPTION OF THE PREFERRED EMBODIMENT

Figure 1:
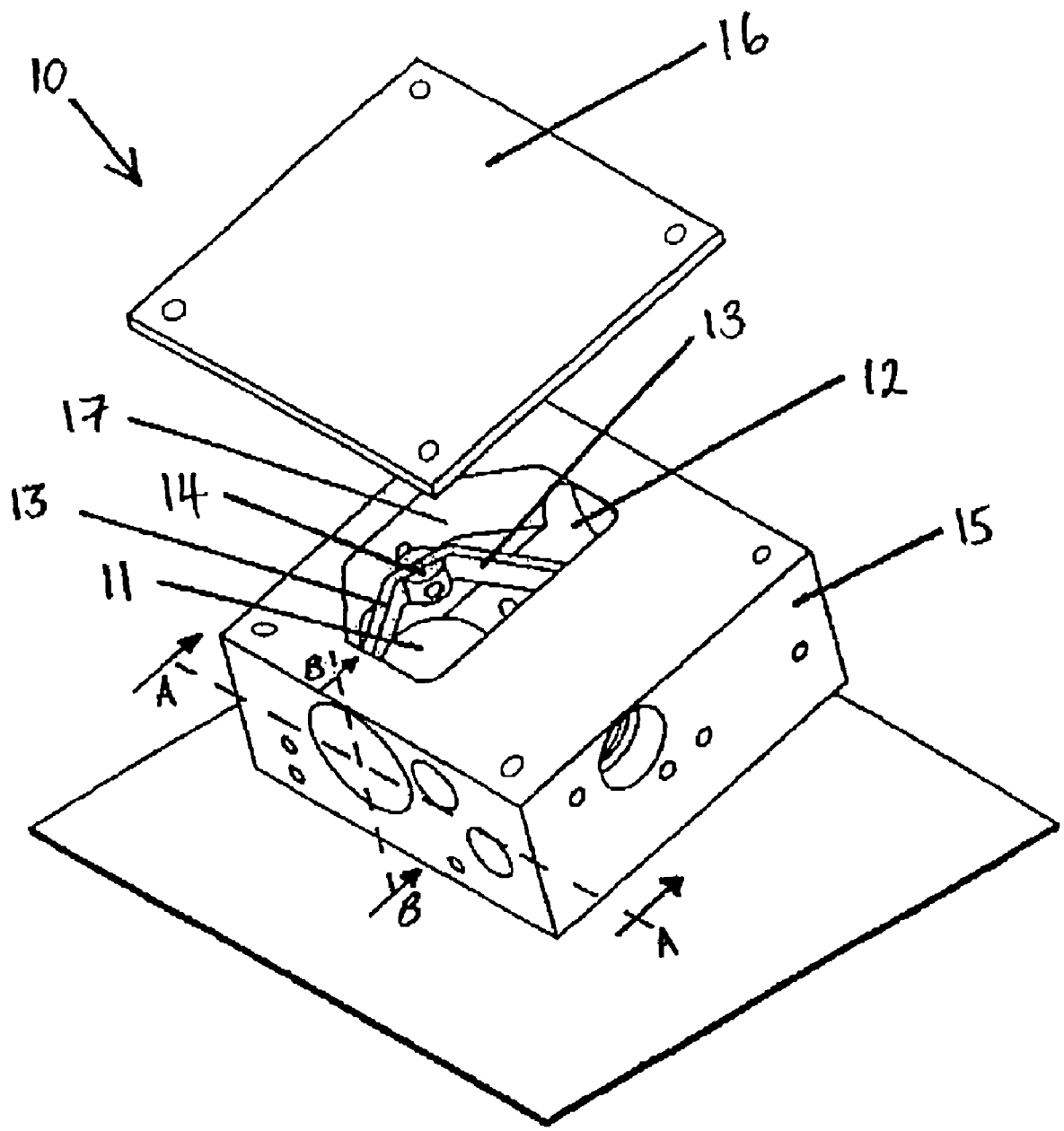
FIG. 1 is a perspective view of the switch arranged at a first angle to the horizontal.
Figure 2:
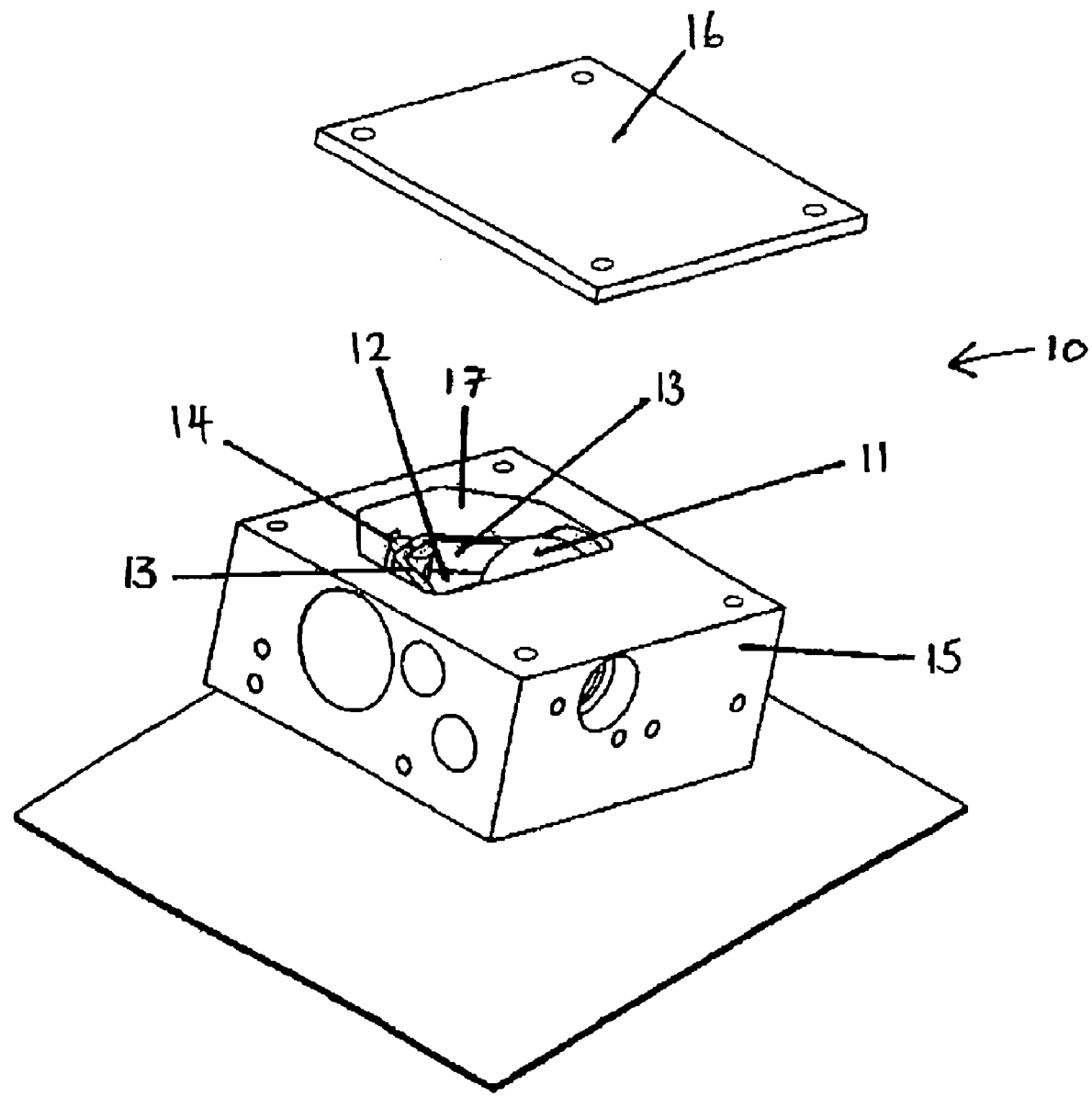
FIG. 2 is a perspective view of the switch arranged at a second angle to the horizontal; and, FIG. 3 is a sectional view taken along plane A-A of FIG. 1.
Figure 3:
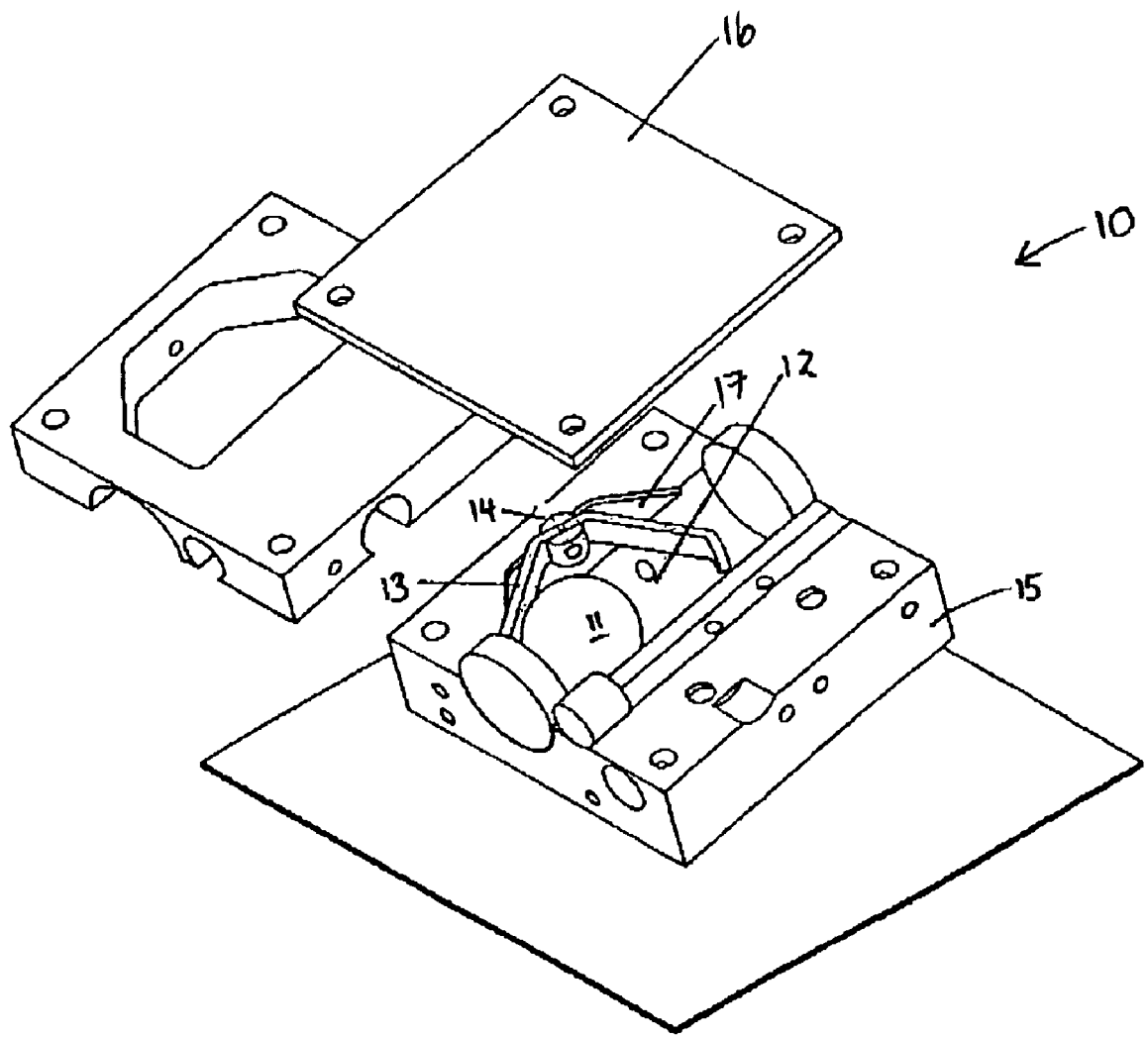
Figure 4:
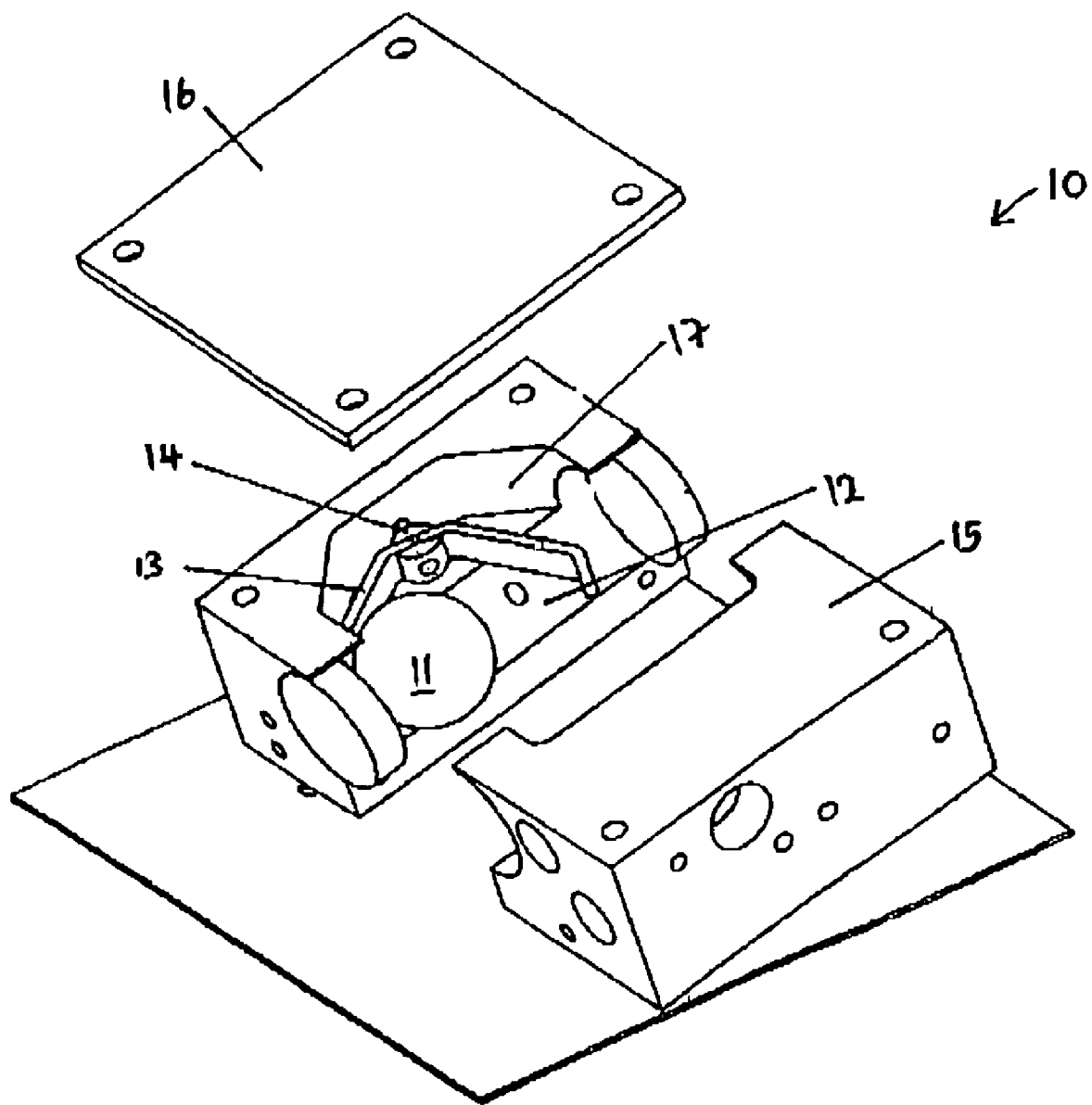
FIG. 4 is a sectional view taken along plane B-B of FIG. 1.

Referring to the FIG. 1 to 4, there is shown a switch 10 which comprises a body 15 formed with an internal chamber 17 and closed by a lid 16. The chamber 17 in the body 15 is formed with a channel 12 along which a ball 11 can roll in accordance with the tilt of the switch 10.

Adjacent the channel 12, there is provided a spindle 14 to which is mounted a member having a pair of arms 13. The arms 13 extend away from the axis of the spindle 14 and diverge from each other, with the distal ends of the arms 13 projecting across the channel 12, either side of the ball 11.

The spindle 14 comprises a through passage (not shown) such that when the switch 10 is orientated as shown in FIG. 1, this through passage is misaligned with duct 18 which extends through the body 15 and forms part of the hydraulic circuit; the spindle 14 thus prevents the passage of hydraulic fluid within the circuit. In this orientation the switch 10 is deemed to be in the "OFF" state.

As the switch 10 is tilted to present a declination to the ball 11, the ball will begin to roll along the channel 12 under the force of gravity. During this movement, the ball 11 will impinge upon an arm 13 causing the spindle 14 to rotate about its axis. As the ball 11 traverses the whole length of the channel 12, the through passage formed in the spindle 14 will align itself with duct 18 of the hydraulic circuit and allow the passage of hydraulic fluid there through. The switch 10 is then deemed to be in the "ON" state. Thus, the angle of inclination of the switch 10 determines whether it is in the "ON" or "OFF" state.

By positioning the switch at the correct location on a mechanical component, such as an excavator bucket, the switch will only release when at a specific orientation, thus preventing a mechanical component from falling from its holding point. In order to release the component, the operator will need to place the holding device on the ground before it can be safely removed.

Figure 5:
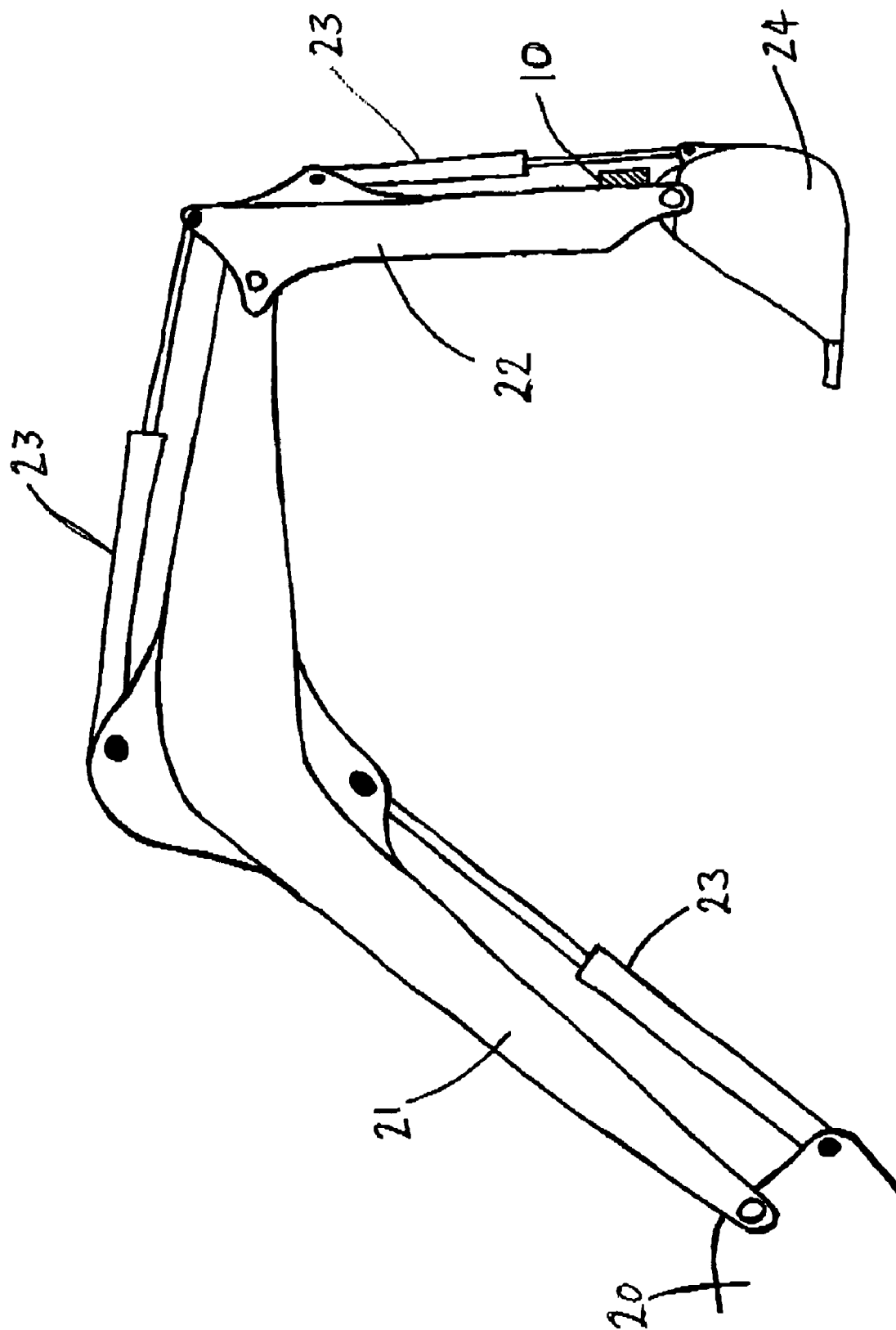
FIG. 5 is a side view of an excavator boom, an excavator arm and detachable bucket.

Referring to FIG. 5 there is shown an excavator boom 21 and an arm 22, which together with a detachable bucket 24 form the working part of an excavator machine (not shown). The boom 21, arm 22 and bucket 24 are secured to the excavator machine via swing frame 20, and the coordinated movement of the boom 21, arm 22 and bucket 24 is facilitated using hydraulic rams 23 which form part of the hydraulic circuit.

The bucket 24 is secured at the distal end of the arm 22 and can only be removed from the arm 22 when the arm 22, and thus the switch 10 which is secured to the arm 22, is suitably orientated with respect to the horizontal to cause the switch to operate. In this manner, the release of the bucket is limited to only when the bucket 24 is placed on the ground.

When the switch 10 is incorporated in a hydraulic circuit associated with an excavation machine or agricultural machine, the switch will be subject to excessive vibration which could damage its switching mechanism. Therefore, the chamber 17 is filled with hydraulic fluid such as oil, which acts not only to dampen the vibration, but also to lubricate the switching mechanism and reduce the impact of the ball 11 on the arms 13. The chamber 17 is formed as part of the hydraulic circuit and so eliminates the need for a separate hydraulic connection to a tank.

It is further envisaged that such a tilt switch can also be used to limit the working range when working at an extreme camber or angle. This particular method of control is suited to agricultural machinery, crane lifting equipment, high platform machinery and military equipment which have a hydraulic emphasis.

For all applications, the hydraulic switch is designed to work in conjunction with a standard check valve to provide a fail safe mechanism that will limit the range of movement/ prevent component release.

The invention claimed is:

1. A switch for incorporating in a hydraulic circuit, said switch comprising a body formed with a chamber, a member disposed in said chamber for movement along a predetermined path, a pivotally mounted element having a pair of arms, one either side of said member, such that said member impinges on one arm or the other in the event of movement in one direction or the other along said path to correspondingly turn said element and change said circuit from one operational state to another, wherein, said chamber acts as a dump for hydraulic fluid from said hydraulic circuit.

2. A switch as claimed in claim 1, wherein said switch is activated by tilt movement.

3. A switch as claimed in claim 1, arranged for said member to move along said path according to the gravitational force component acting on said member along said path.

4. A switch as claimed in claim 1, wherein said member can move along said channel when said channel is declined relative to said member at an angle of at least 1 degree.

5. A switch as claimed in claim 1, wherein said member comprises a ball.

6. A switch as claimed in claim 5, wherein the diameter of said ball is in the range 16-26mm.

7. A switch as claimed in claim 5, wherein the diameter of said ball is in the range 18-24mm.

8. A switch as claimed in claim 5, wherein the diameter of said ball is in the range 20-22mm.

9. A switch as claimed in claim 1, wherein said hydraulic fluid is oil.

10. A switch as claimed in claim 1, wherein said hydraulic fluid lubricates said member and said element.

11. A switch as claimed in claim 10, wherein said hydraulic fluid dampens any vibration of the switch.

12. A switch as claimed in claim 1, wherein a mounting spindle of said element comprises at least one through passage arranged to align in at least one rotational position thereof, with a duct formed in said body and forming part of a hydraulic circuit.

13. A switch as claimed in claim 1, wherein said switch is used to limit the removal of components within said circuit to specific operating circumstances.

14. A switch as claimed in claim 1, wherein said switch provides a limit to the working range of a hydraulically operated device.

15. A hydraulic circuit comprising a switch as claimed in claim 1.

16. An excavator comprising a bucket for excavation, said bucket being operated by a hydraulic circuit incorporating a switch as claimed in claim 1.

* * * * *